United States Patent
Tsai et al.

(10) Patent No.: US 8,090,720 B2
(45) Date of Patent: Jan. 3, 2012

(54) METHOD FOR MERGING DOCUMENT CLUSTERS

(75) Inventors: Hong-Yang Tsai, Taipei (TW); Cho Hsun-Hsueh, Taipei (TW)

(73) Assignee: Esobi Inc., George Town (KY)

( * ) Notice: Subject to any disclaimer, the term of this patent is extended or adjusted under 35 U.S.C. 154(b) by 287 days.

(21) Appl. No.: 12/559,964

(22) Filed: Sep. 15, 2009

(65) Prior Publication Data

US 2010/0082625 A1    Apr. 1, 2010

(30) Foreign Application Priority Data

Sep. 19, 2008 (TW) .............................. 97136090 A

(51) Int. Cl.
   *G06F 17/30* (2006.01)

(52) U.S. Cl. ...................................... 707/737; 707/748

(58) Field of Classification Search ................. 707/737, 707/738, 748, 752, 753
See application file for complete search history.

(56) References Cited

U.S. PATENT DOCUMENTS

| | | | |
|---|---|---|---|
| 6,654,739 B1 * | 11/2003 | Apte et al. | 1/1 |
| 7,617,176 B2 * | 11/2009 | Zeng et al. | 1/1 |
| 2003/0220916 A1 * | 11/2003 | Imaichi et al. | 707/3 |
| 2006/0026152 A1 * | 2/2006 | Zeng et al. | 707/5 |
| 2007/0271226 A1 * | 11/2007 | Zhang et al. | 707/3 |
| 2010/0082625 A1 * | 4/2010 | Tsai et al. | 707/737 |
| 2011/0087668 A1 * | 4/2011 | Thomas et al. | 707/738 |

* cited by examiner

*Primary Examiner* — Jean M Corrielus
(74) *Attorney, Agent, or Firm* — Morris Manning & Martin LLP; Tim Tingkang Xia, Esq.

(57) ABSTRACT

A method for merging document clusters includes the following steps. An association graph among document clusters is established. The association graph is an oriented graph. Each document cluster is represented by one node in the association graph, and each node is searched in a pair-wise manner. An oriented edge is established between any two nodes having associated weights there-between reaching a preset value. An arrow of the oriented edge points to a node capable of serving as a descriptor for the other node. An associated weight is assigned to the oriented edge to represent an association degree between the two nodes. Any two document clusters that can serve as a descriptor for each other and have an association degree there-between reaching a preset threshold value are merged into a single document cluster.

7 Claims, 11 Drawing Sheets

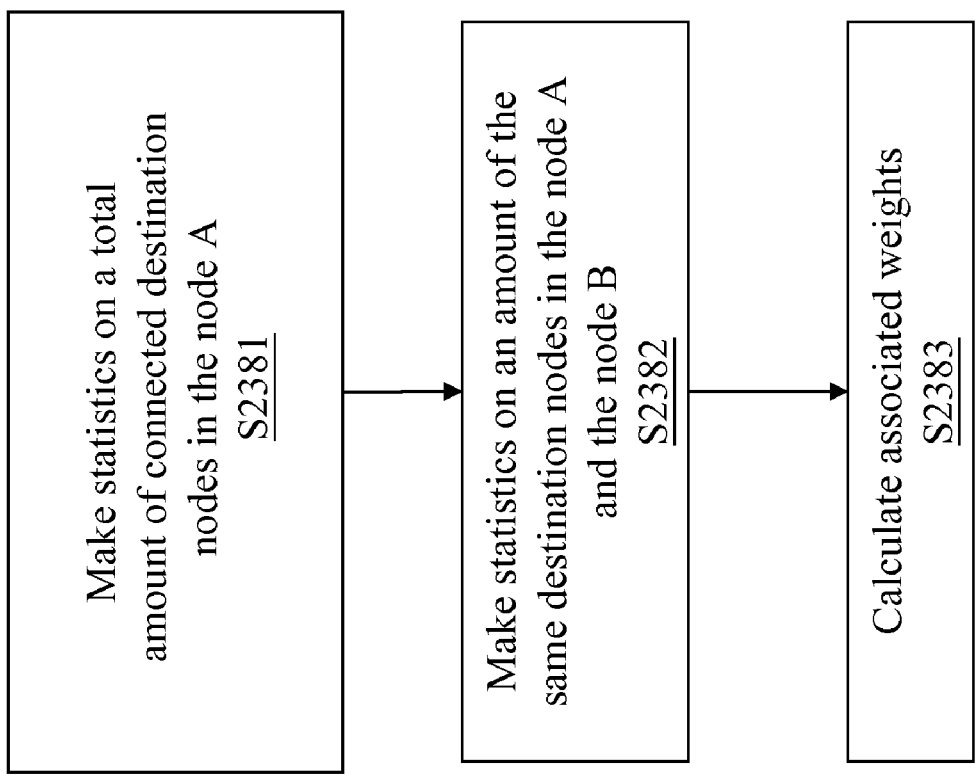

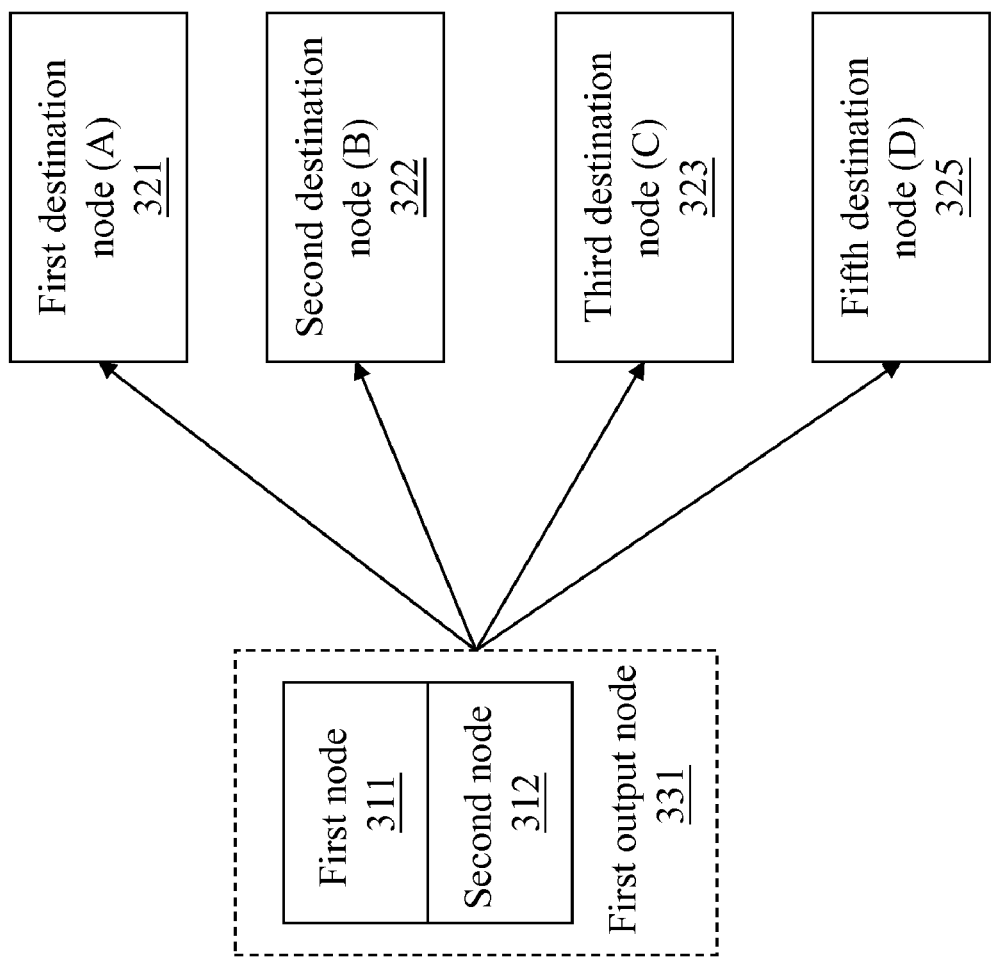

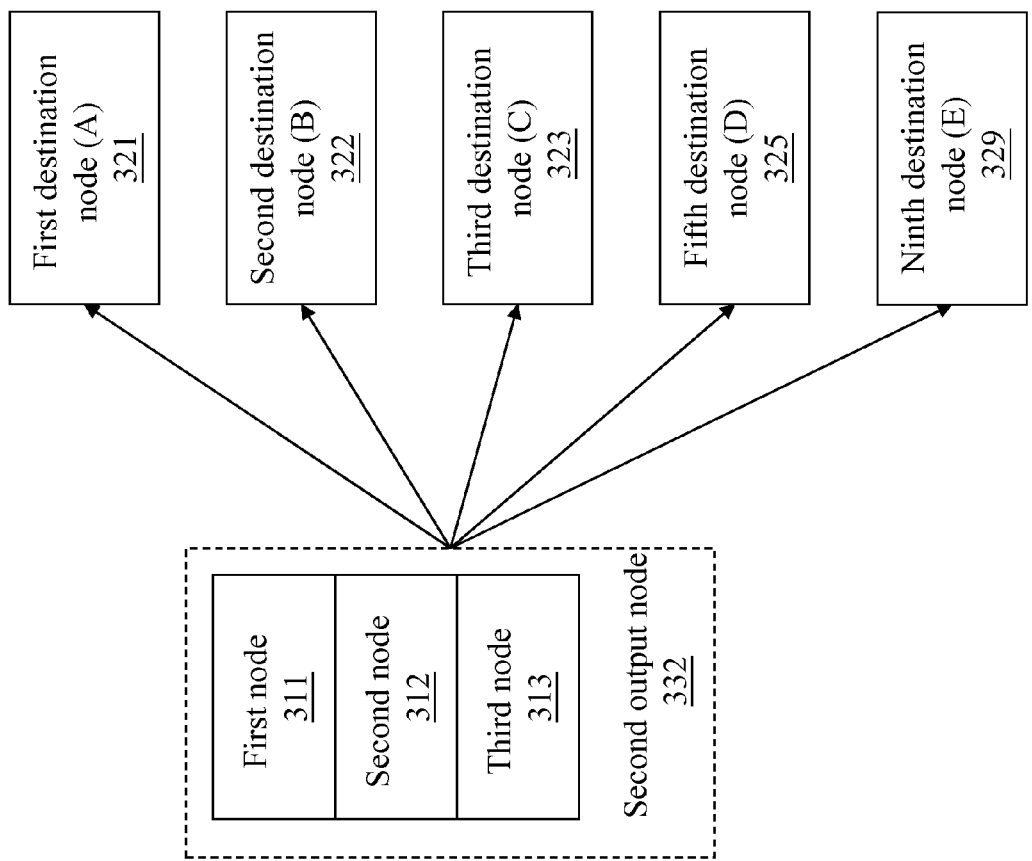

METHOD FOR MERGING DOCUMENT CLUSTERS

CROSS-REFERENCE TO RELATED APPLICATIONS

This non-provisional application claims priority under 35 U.S.C. §119(a) on Patent Application No(s). 097136090 filed in Taiwan, R.O.C. on Sep. 19, 2008, the entire contents of which are hereby incorporated by reference.

BACKGROUND OF THE INVENTION

1. Field of the Invention

The present invention relates to a document processing method, and more particularly to a method for merging document clusters, which is suitable for merging associated web page clusters or document clusters.

2. Related Art

As computer word software has been widely used, digital documents are greatly increased. When the digital documents are processed or managed, some functions of automatically detecting or comparing documents are usually needed. For example, a basic vocabulary comparison technology is needed in the process of producing and using digital characters, and similarly, a digital document also needs such functions, that is to say, the object to be compared is raised from a vocabulary level to a document level. The so-called document means a paragraph or an article formed by natural languages or vocabularies. For example, a common article, a paragraph of an article, a sentence of an article, a field (such as a topic of an official document), questions raised by users, or answers replied from service personnel may all be regarded as a document.

In order to classify various documents, document clusters (i.e., document collections) are generally classified by using a support vector machine (SVM) proposed by Vladimir Vapnik in the year of 1990. The SVM is based on a structural risk minimization principle in the statistical theory, so as to obtain an optimal hyper-plane in a set space domain. Furthermore, positive and negative samples are distinguished. Nowadays, many modifications and applications have still been proposed.

The document cluster is a collection of many documents, and each document has one or more key vocabularies. Each document is regarded as a vector in the SVM. An amount of key vocabularies in each document turns to be a dimension in the SVM. The effect of document classification may be undesirable as the space and dimension of the feature vectors are too high.

SUMMARY OF THE INVENTION

In view of the above problems, the present invention is a method for merging documents, which is applicable to merge document clusters (for example, clusters of web pages, text documents, or database contents) having high association degrees.

In order to achieve the above objectives, the present invention provides a method for merging document clusters, which comprises the following steps. An association graph among document clusters is established. The association graph is an oriented graph. Each document cluster is represented by one node in the association graph. An associated weight is assigned to an oriented edge connecting any two nodes to represent an association degree between the two document clusters. Any two document clusters that can serve as a descriptor for each other and have an association degree there-between reaching a preset threshold value are merged into a single document cluster.

In another preferred embodiment of the present invention, two document clusters having an indirect association degree there-between reaching a preset threshold value are further merged together. The so-called indirect association degree means a proportion taken by a number of common descriptors for two document clusters in a total number of descriptors of the two document clusters.

BRIEF DESCRIPTION OF THE DRAWINGS

The present invention will become more fully understood from the detailed description given herein below for illustration only, and thus is not limitative of the present invention, and wherein:

FIG. 2D is a schematic flow chart of calculating associated weights of nodes;

FIG. 3C is a schematic view of merging the first node and the second node;

FIG. 3E is a schematic view of merging the first output node and a third node.

DETAILED DESCRIPTION OF THE INVENTION

Figure 1:
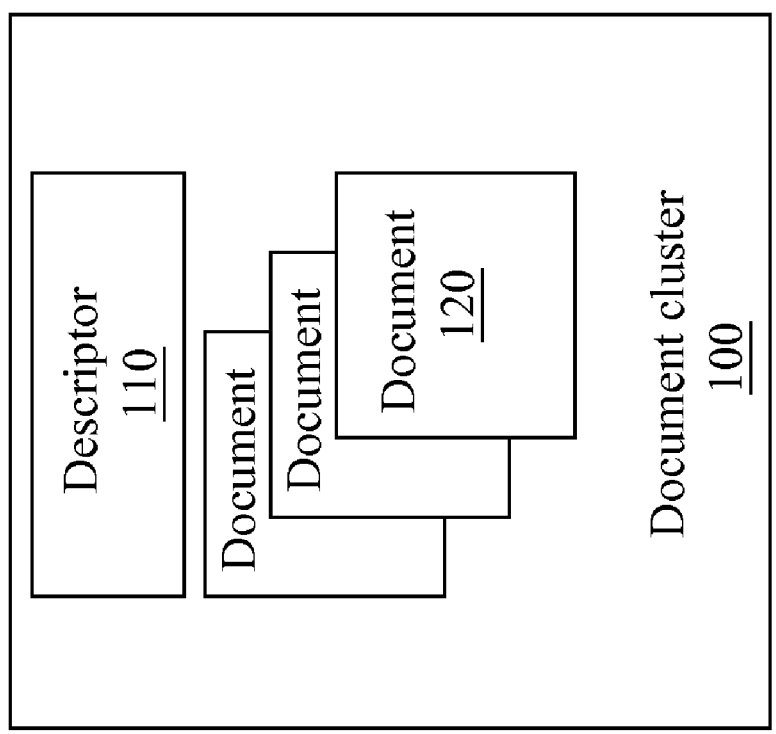
FIG. 1 is a schematic view of a node structure according to the present invention.

The document cluster mentioned in the present invention refers to a document collection searched by using a key vocabulary. The processing means such as data mining or vocabulary frequency analysis may be used in the searching process. Therefore, each document cluster comprises the following composition elements. FIG. 1 is a schematic view of a node structure according to the present invention. A document cluster 100 (cluster_n) represents a $100^{th}$ document cluster. The document cluster 100 in the present invention is a cluster of web pages, text files, or database contents. Each document cluster 100 comprises a plurality of documents 120. A descriptor 110 is a character collection formed by at least one character. For example, in the document 120 of a text file, the descriptor 110 may be a collection of key words/phrases or other similar features of the document cluster.

Figure 2A:
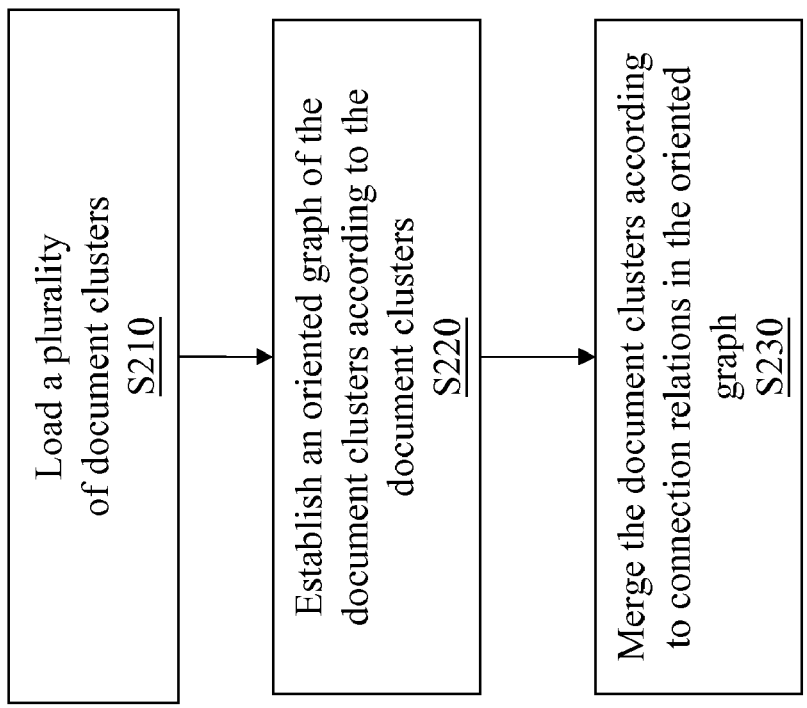
FIG. 2A is a schematic flow chart of the present invention.

Referring to FIG. 2A, a plurality of document clusters is loaded (Step S210). According to the document clusters, an oriented graph of the document clusters is established (Step S220). The document clusters are merged according to connection relations in the oriented graph (Step S230).

Figure 2B:
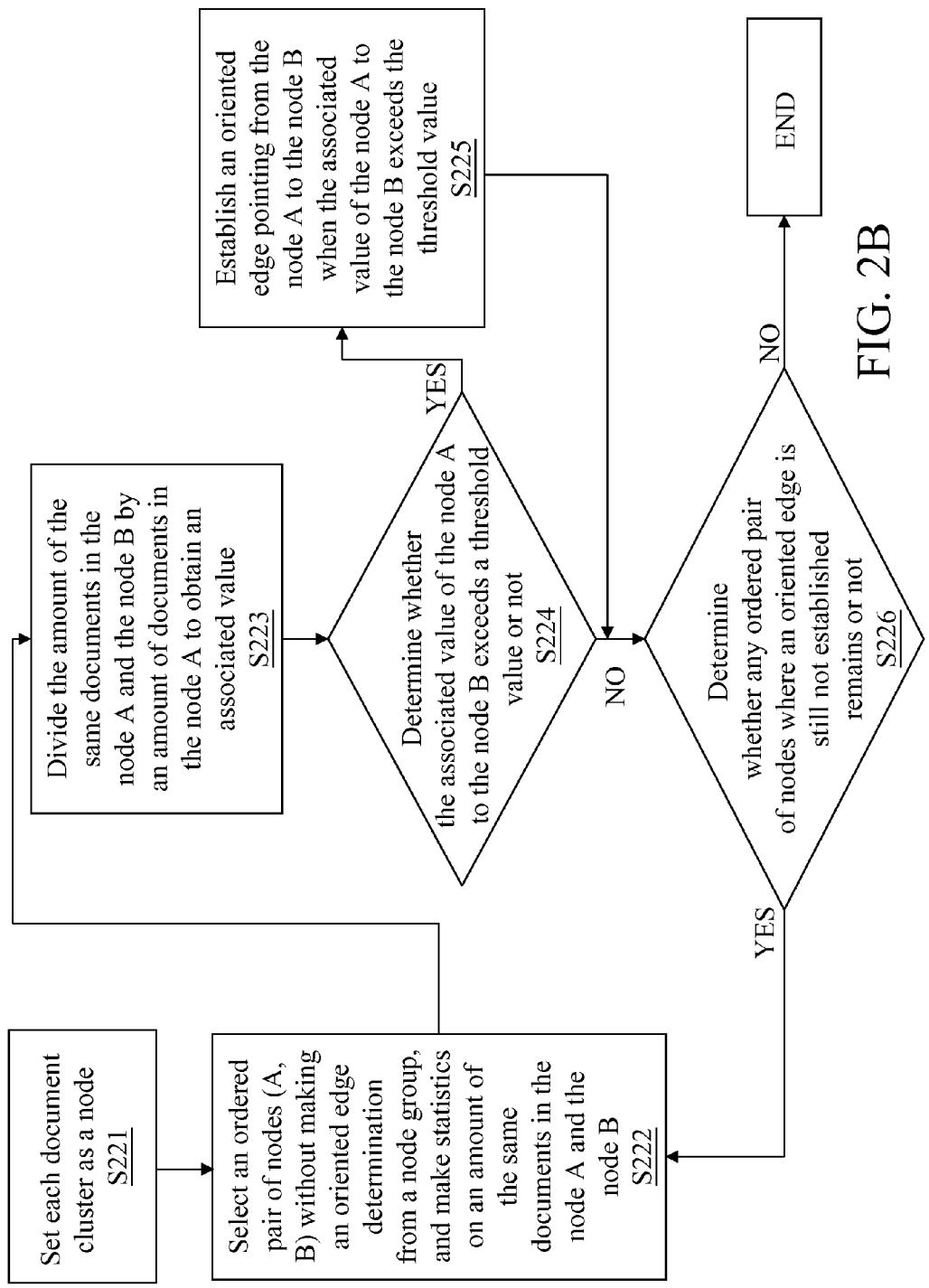
FIG. 2B is a schematic flow chart of establishing an oriented graph.

Referring to FIG. 2B, the process for establishing an oriented graph further comprises the following steps. Each document cluster is set as a node (Step S221).

An ordered pair of nodes (A, B) without making an oriented edge determination is selected from a node group, and an amount of the same documents (document$_{amount}$) in the node A and the node B is calculated statistically (Step S222). The amount of the same documents in the node A and the node B (document$_{amount}$) is divided by an amount of documents (cluster_i_document$_{total}$) in the node A to obtain an associated value (Step S223).

$$\left(\frac{document_{amount}}{cluster\_i\_document_{total}}\right)$$

For example, the node A has 10 documents, and the node B has 11 documents. An amount of documents having a descriptor B in the node A is obtained, and an amount of documents having a descriptor A in the node B is obtained. It is assumed that the amount of documents having the descriptor B in the node A is 5, and the amount of documents having the descriptor A in the node B is 6. Therefore, an associated value of the node A to the node B is 5/10. An associated value of the node B to the node A is 6/11.

It is determined whether the associated value of the node A to the node B exceeds a threshold value or not (Step S224). When the associated value of the node A to the node B exceeds the threshold value, an oriented edge pointing from the node A to the node B is established (Step S225). To resume the example in Step S223, it is assumed that the threshold value is 0.5, such that the associated values of the above two nodes both exceeds the threshold value. Therefore, an oriented edge from the first node to the second node and an oriented edge from the second node to the first node are established respectively. Finally, it is determined whether any ordered pair of nodes where an oriented edge is still not established remains or not (Step S226). Two nodes are selected from all nodes to compare with each other to obtain relative associated values thereof, till all the nodes are compared in a pair-wise manner. If any unprocessed node still exists, Step S222 is repeated till all the nodes are traversed.

Figure 2C:
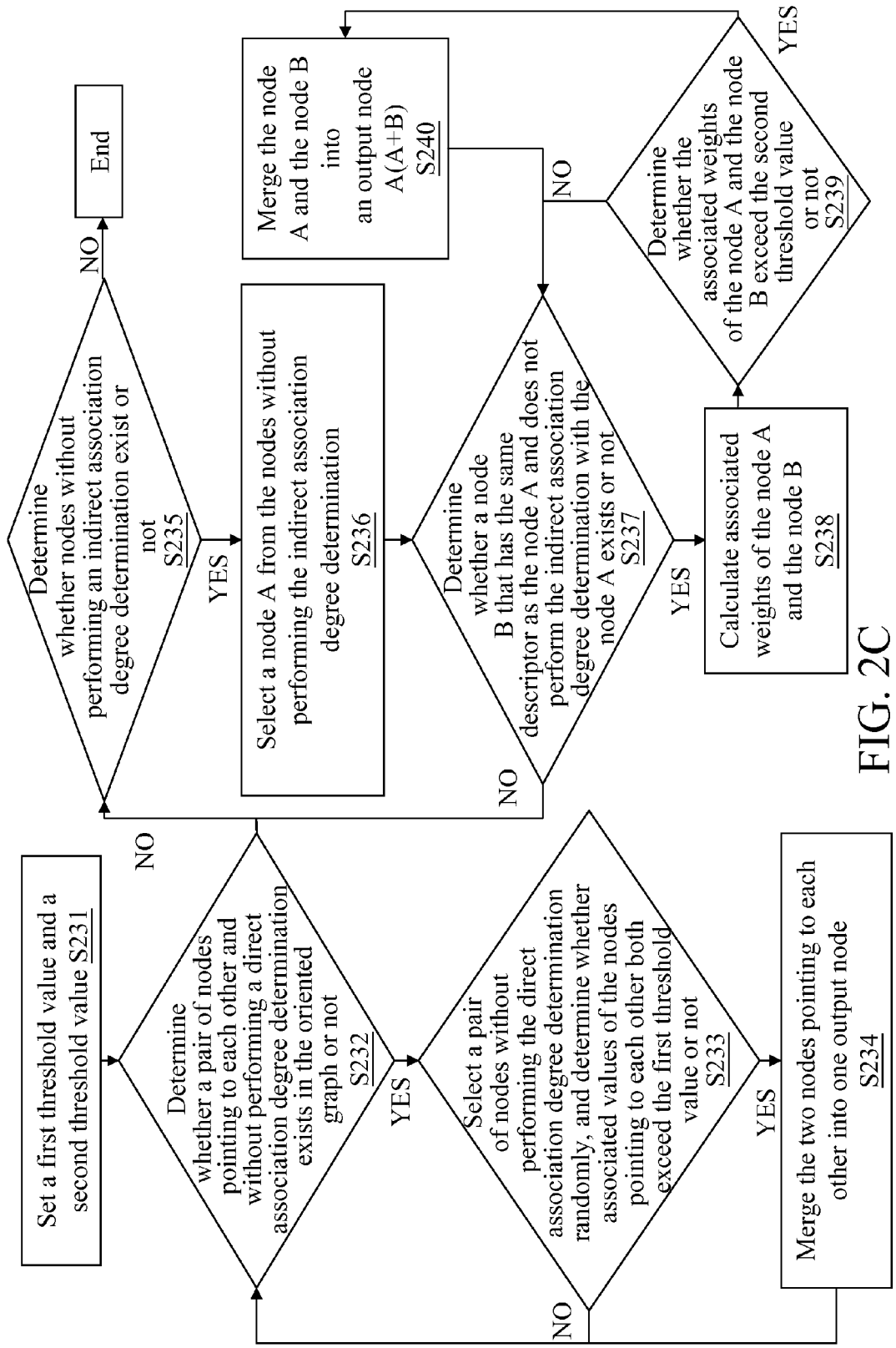
FIG. 2C is a schematic view of merging processing of document clusters according to an embodiment of the present invention.

Next, in the present invention, the document clusters are merged according to connection relations among all nodes in the oriented graph. FIG. 2C is a schematic view of merging processing of document clusters according to an embodiment of the present invention. Referring to FIG. 2C, a first threshold value (k1) and a second threshold value (k2) are set (Step S231). In this embodiment, it should be noted that, the first threshold value and the second threshold value are not limited to being the same as the associated value or not.

Then, it is determined whether each pair of nodes pointing to each other in the oriented graph has completed a direct association comparison or not (Step S232). If nodes without performing the direct association comparison still exist, a pair of nodes without performing a direct association degree determination is randomly selected, and meanwhile, it is further determined whether associated values $$\left(\frac{document_{amount}}{cluster\_i\_document_{total}}\right)$$

of the nodes pointing to each other both exceed the first threshold value or not (Step S233).

When the two associated values of the nodes pointing to each other both exceed the first threshold value, the two nodes pointing to each other are merged into one output node (Step S234). Step S232 is repeated, till every pair of nodes pointing to each other in the oriented graph is traversed.

If nodes pointing to each other do no exist in the oriented graph or all the nodes in the oriented graph have completed the direct association comparison, it is determined whether nodes without performing an indirect association degree determination exist or not (Step S235).

A node A is selected from the nodes without performing the indirect association degree determination (Step S236). Then, it is determined whether a node B that has the same descriptor as the node A and does not perform the indirect association degree determination with the node A exists or not (Step S237). Associated weights of the node A and the node B are calculated (Step S238).

FIG. 2D is a schematic flow chart of calculating associated weights of nodes. Referring to FIG. 2D, the process of setting the associated weights further comprises the following steps. First, a total amount of connected destination nodes (cluster_n_feature$_{amount}$) in the node A is calculated statistically (Step S2381). Next, an amount of the same destination nodes (feature$_{total}$) in both the node A and the node B is then calculated statistically (Step S2382). Finally, the associated weight $$\left(\frac{feature_{total}}{cluster\_n\_feature_{amount}}\right)$$

is calculated respectively (Step S2383), in which the amount of the same destination nodes (feature$_{total}$) in the two nodes is respectively divided by the total amount of connected destination nodes (cluster_n_feature$_{amount}$) in the node. For example, if the first node points to 10 destination nodes, the second node points to 12 destination nodes, and 3 destination nodes of the same contents exist in both the first node and the second node, so that the associated weight of the first node is 3/10 and the associated weight of the second node is 3/12.

After the associated weights between the node A and the node B are obtained, it is determined whether the associated weights $$\left(\frac{feature_{total}}{cluster\_n\_feature_{amount}}\right)$$

between the node A and the node B exceed the second threshold value (k2) or not (Step S239). If the associated weights $$\left(\frac{feature_{total}}{cluster\_n\_feature_{amount}}\right)$$

of the destination nodes having the same descriptor both exceed the second threshold value (k2), the node A and the node B are merged into an output node A(A+B) (Step S240). The output node A(A+B) means that documents in the node A and documents in the node B are merged into the output node A. If the node A and the node B do not exceed the second threshold value or the node A and the node B are merged, Step S237 is repeated till every node in the oriented graph has completed the indirect association comparison. The above operations are repeated till no merging motion occurs any more.

Figure 2E:
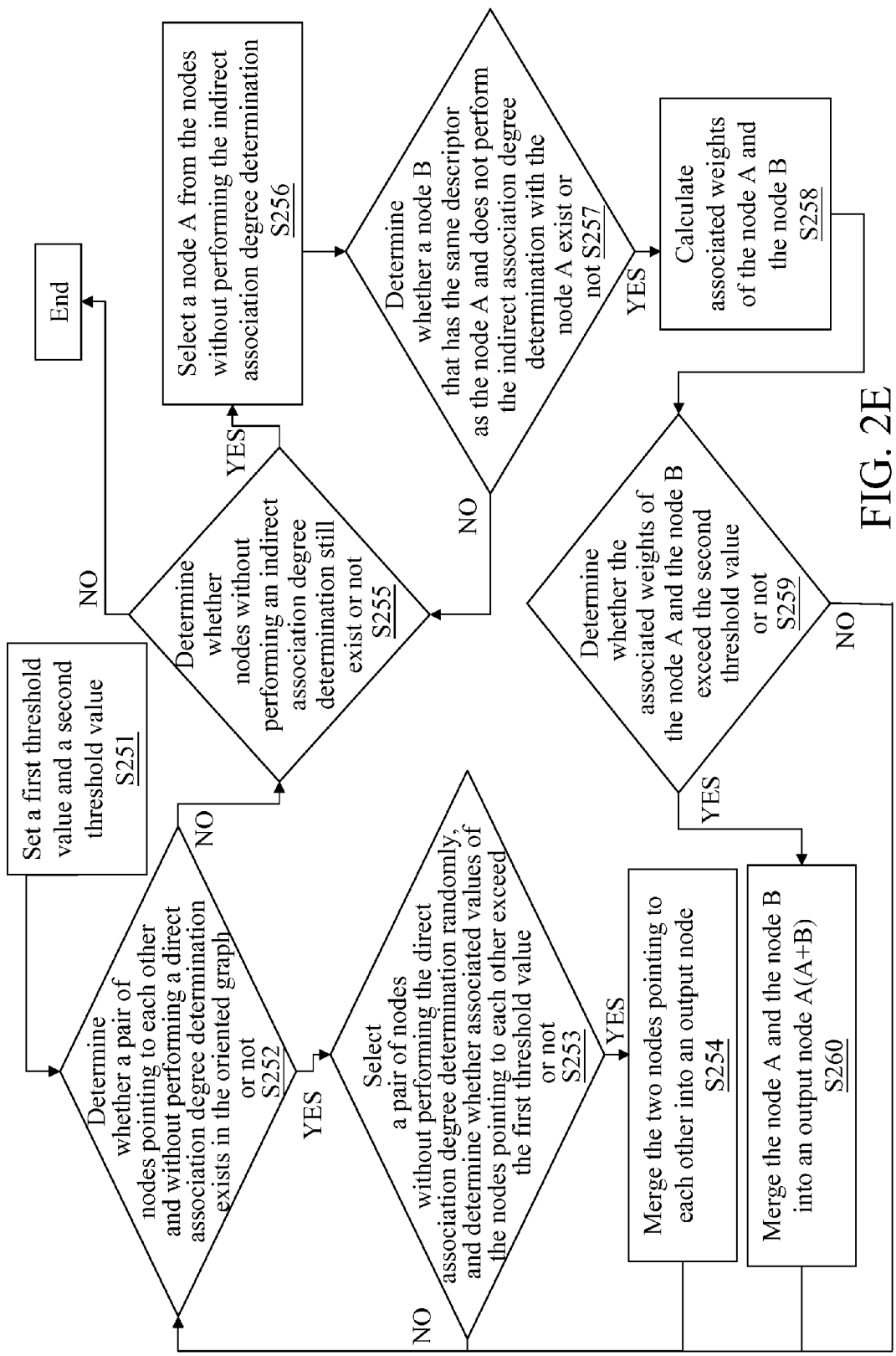
FIG. 2E is a schematic view of merging processing of document clusters according to another embodiment of the present invention.

FIG. 2E is a schematic view of merging processing of document clusters according to another embodiment of the present invention. Referring to FIG. 2E, a difference between this embodiment of the present invention and the above embodiment is that, the indirect association comparison is performed only after the direct association comparison is completed in the above embodiment; whereas the direct association is compared and then the indirect association is compared in sequence, and such a step is repeated until each node in the oriented graph is completed, in the embodiment shown in FIG. 2E.

A first threshold value (k1) and a second threshold value (k2) are set (Step S251). It is determined whether each pair of nodes pointing to each other in the oriented graph has completed a direct association comparison or not (Step S252). If nodes without performing the direct association comparison exist, a pair of nodes without performing a direct association degree determination is randomly selected, and meanwhile, it is further determined whether associated values $$\left(\frac{document_{amount}}{cluster\_i\_document_{total}}\right)$$

of the nodes pointing to each other both exceed the first threshold value or not (Step S253).

If the two associated values of the nodes pointing to each other both exceed the first threshold value, the two nodes pointing to each other are merged into an output node (Step S254). Next, if nodes pointing to each other do not exist in the oriented graph or all the nodes in the oriented graph have completed the direct association comparison, it is determined whether nodes without performing an indirect association degree determination still exist or not (Step S255).

Then, a node A is selected from the nodes without performing the indirect association degree determination (Step S256). Then, it is determined whether a node B that has the same descriptor as the node A and does not perform the indirect association degree determination with the node A exist or not (Step S257). Then, associated weights of the node A and the node B are calculated (Step S258). After the associated weights of the node A and the node B are obtained, it is determined whether the associated weights $$\left(\frac{feature_{total}}{cluster\_n\_feature_{amount}}\right)$$

of the node A and the node B exceed the second threshold value (k2) or not (Step S259). If the associated weights $$\left(\frac{feature_{total}}{cluster\_n\_feature_{amount}}\right)$$

of the destination nodes having the same descriptor both exceed the second threshold value (k2), the node A and the node B are merged into an output node A(A+B) (Step S260).

If the associated weights of the node A and the node B do not exceed the second threshold value or after the node A and the node B are merged, Step S252 is then repeated till every node in the oriented graph has completed the direct association comparison and indirect association comparison.

Figure 3A:
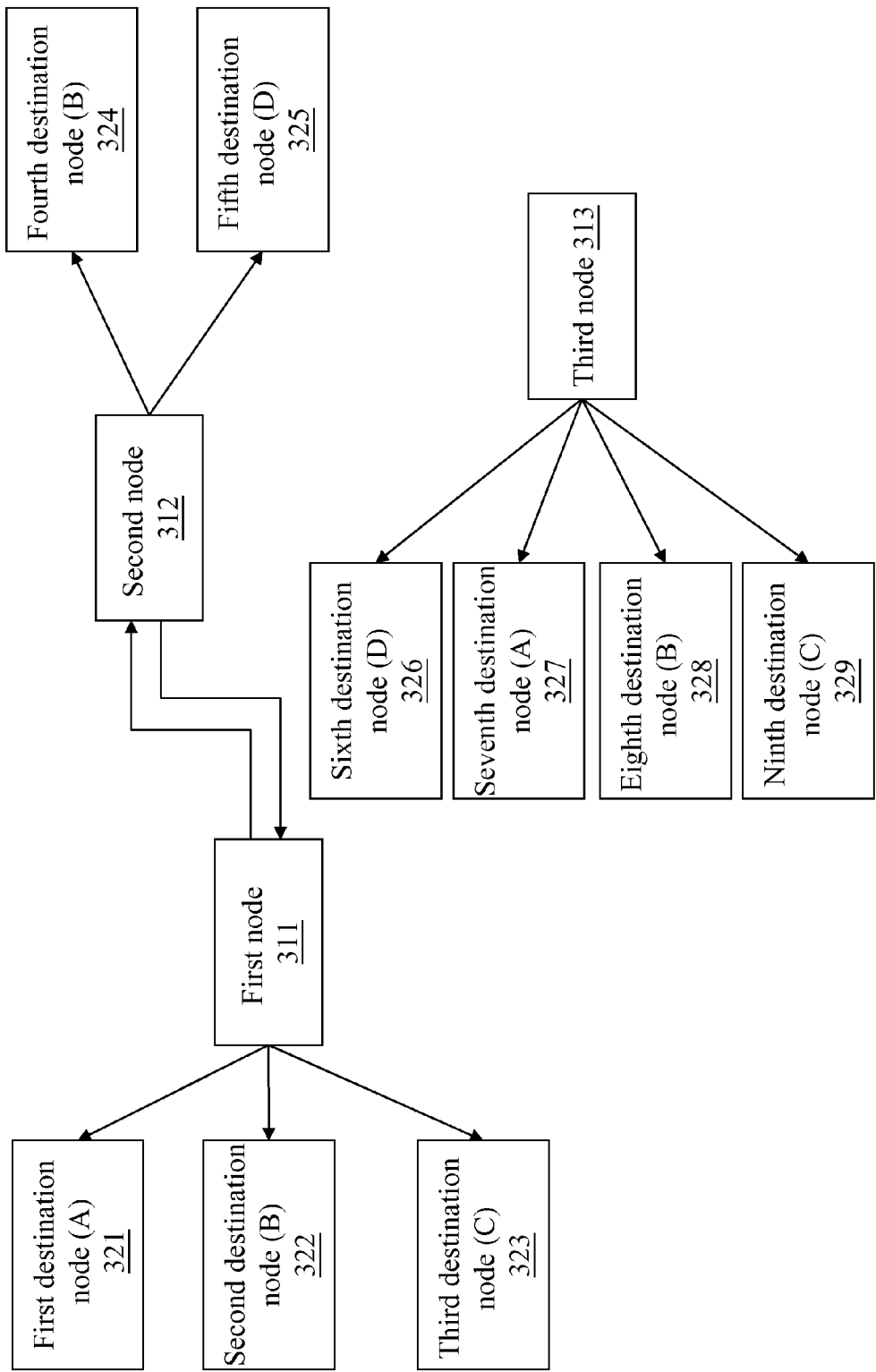
FIG. 3A is a schematic view of an oriented graph of each document cluster.

The operations of the present invention are illustrated below through the following oriented graph, and it should be noted that, the present invention is not limited to the document types and amounts in this embodiment. FIG. 3A is a schematic view of an oriented graph of each document cluster. In such an oriented graph, a first node 311 (cluster_1), a second node 312 (cluster_2), and a third node 313 (cluster_3) are defined. In order to clearly illustrate the contents of each descriptor 110, a destination node (feature_n(X)) is further defined, which is an $n^{th}$ destination node, and X indicates the contents of the destination node. Moreover, it is further defined that a threshold value is 0.3, a first threshold value is 0.7, and a second threshold value is 0.5.

The first node 311 points to a first destination node 321 (feature_1(A)), a second destination node 322 (feature_2 (B)), and a third destination node 323 (feature_3(C)) respectively. The second node 312 points to a fourth destination node 324 (feature_4(B)) and a fifth destination node 325 (feature_5(D)) respectively. The third node 313 points to a sixth destination node 326 (feature_6(D)), a seventh destination node 327 (feature_7(A)), an eighth destination node 328 (feature_8(B)), and a ninth destination node 329 (feature_9 (E)) respectively.

Figure 3B:
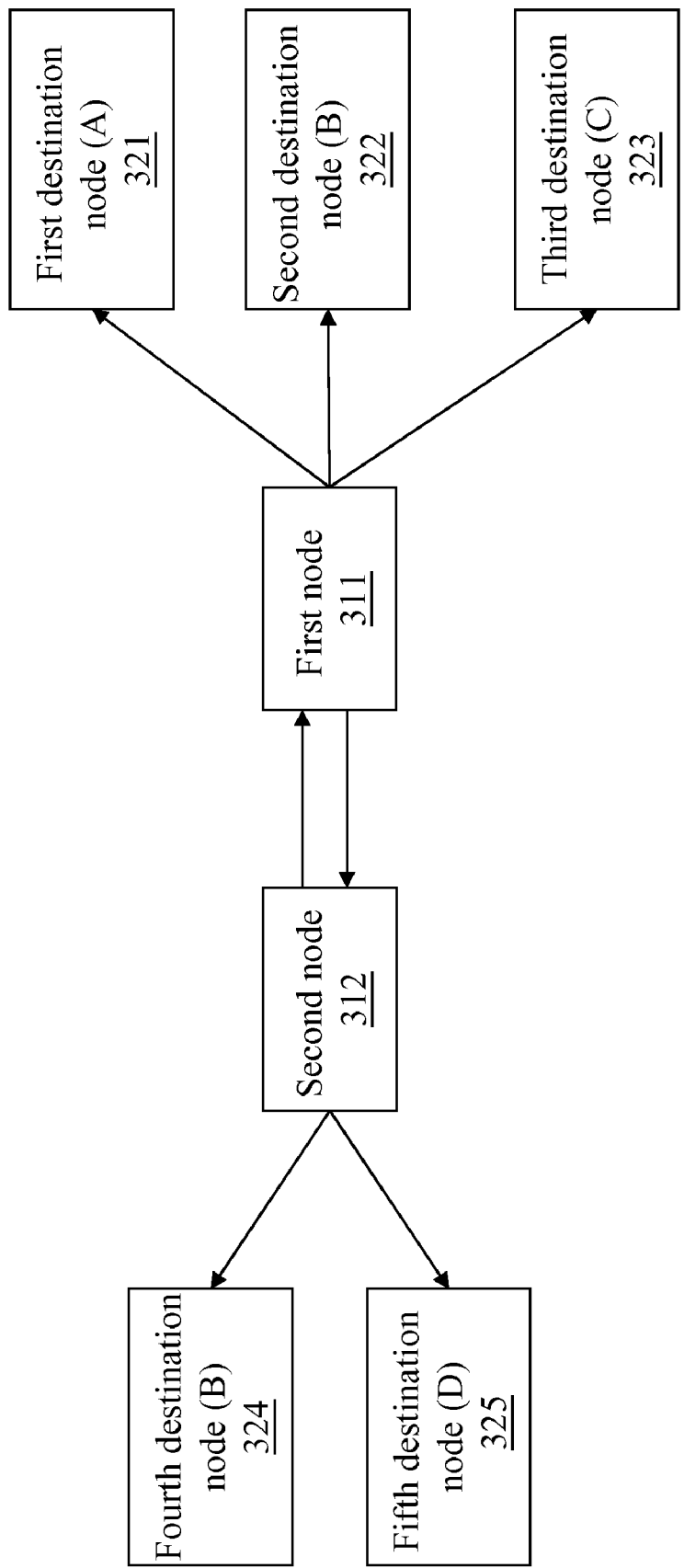
FIG. 3B is a schematic view of establishing an oriented edge between a first node and a second node.

The first node 311 comprises 10 documents. The second node 312 comprises 9 documents. The first node 311 and the second node 312 have 5 identical documents. Therefore, an associated value of the first node 311 to the second node 312 is 5/10, and an associated value of the second node 312 to the first node 311 is 5/9. The above two associated values are both greater than the threshold value of 0.3. Thus, oriented edges are established respectively between the first node 311 and the second node 312. FIG. 3B is a schematic view of establishing an oriented edge between a first node and a second node. In addition, the two associated values are also both greater than the first threshold value of 0.7, so that the first node 311 and the second node 312 may be merged to generate a first output node 331. FIG. 3C is a schematic view of merging the first node and the second node.

Figure 3D:
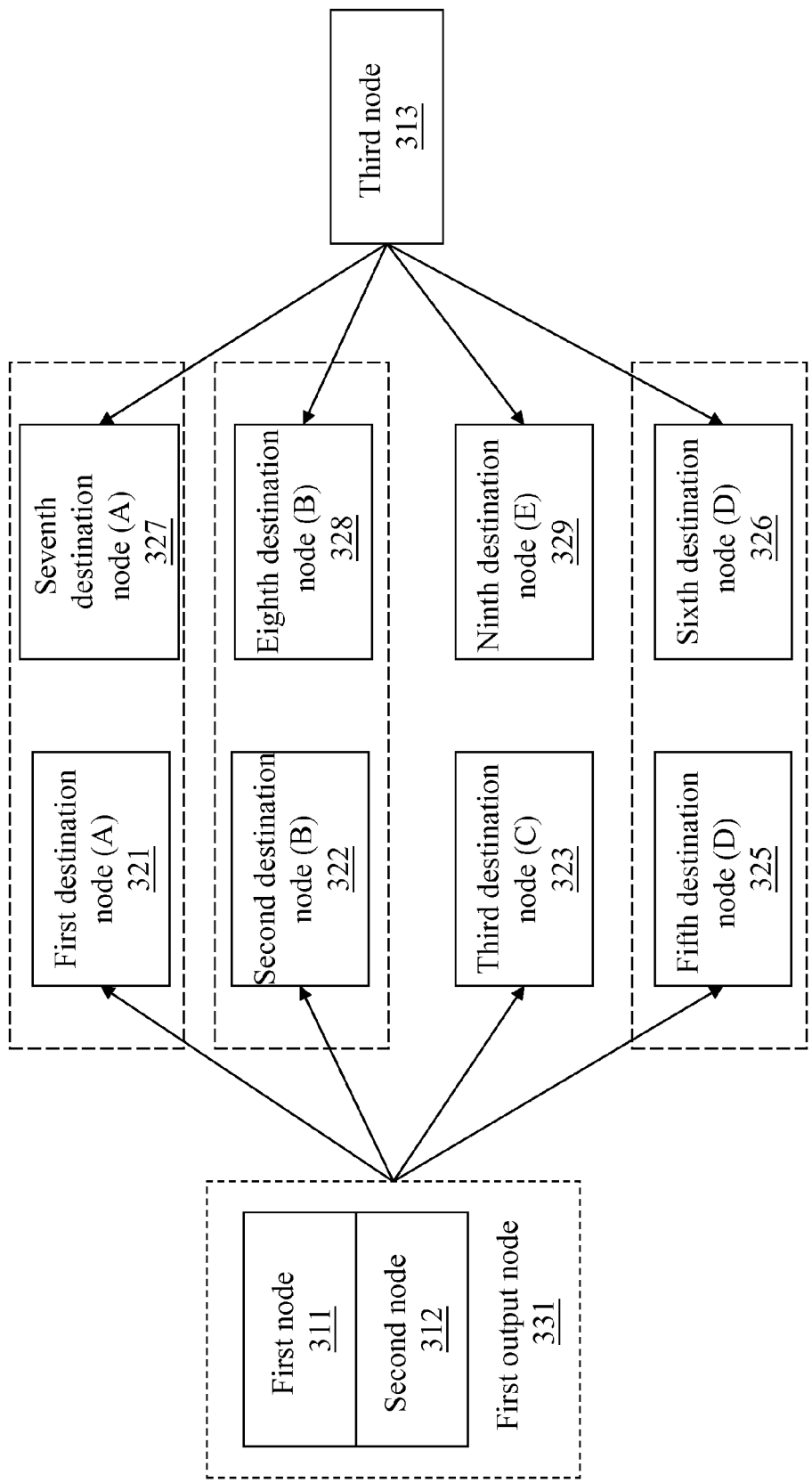
FIG. 3D is a schematic view of merging common destination nodes between a first output node and the second node.

Then, referring to FIG. 3D, the first output node 331 and the third node 313 are merged. As the first node 311 and the second node 312 do not have oriented edges to the third node 313 respectively, an oriented edge does not exist from the first output node 331 to the third node 313. Thus, destination nodes with the same contents in both the first output node 331 and the third node 313 are obtained. The destination nodes with the same contents include the first destination node 321 (feature_1(A)) and the seventh destination node 327 (feature_7(A)), the second destination node 322 (feature_2(B)) and the eighth destination node 328 (feature_8(B)), and the fifth destination node 325 (feature_5(D)) and the sixth destination node 326 (feature_6(D)) respectively.

The first output node 331 and the third node 313 have three pairs of destination nodes with the same descriptor 110 respectively. Thus, the associated weight of the first output node 331 to the destination node is 3/4, and the associated weight of the third node to the destination node is also 3/4. The two associated weights to the destination node are both greater than the second threshold value of 0.5. Therefore, the first output node 331 and the third node 313 may be merged to generate a second output node 332. FIG. 3E is a schematic view of merging the first output node and a third node.

What is claimed is:

1. A method for merging document clusters, wherein a corresponding document cluster is generated for each descriptor, each document cluster comprises a plurality of documents, and document clusters having a high association degree are merged, the method comprising:

establishing an oriented graph, comprising:
  setting each document cluster as a node;
  making statistics on an amount of the same documents (document$_{amount}$) commonly presented in one node and another node;
  calculating an associated value $$\left(\frac{document_{amount}}{cluster\_i\_document_{total}}\right)$$

of the node according to an amount of documents in the node (cluster_i_document$_{total}$), wherein i represents the i$^{th}$ document cluster; and
  when the associated value of the node to another node reaches a threshold value, establishing an oriented edge to point from the node to the another node;
  determining whether nodes pointing to each other exist or not;
  if associated values $$\left(\frac{document_{amount}}{cluster\_i\_document_{total}}\right)$$

of the nodes pointing to each other are greater than a first threshold value, merging the nodes into an output node;
  if the nodes pointing to each other do not exist, finding out destination nodes having the same descriptor and nodes pointed to by the destination nodes;
  calculating an associated weight between the destination nodes and the nodes respectively; and
  if the associated weights of the destination nodes having the same descriptor are greater than a second threshold value, merging the nodes into an output node.

2. The method for merging document clusters according to claim 1, wherein the document is a web page, a text file, or database content.

3. The method for merging document clusters according to claim 1, wherein the descriptor is at least one text set.

4. The method for merging document clusters according to claim 1, wherein the step of establishing the oriented edge further comprises:
  selecting the nodes repetitively and calculating the associated value between the nodes until all the nodes are traversed.

5. The method for merging document clusters according to claim 1, wherein the step of setting the associated weight further comprises:
  selecting one node (cluster_n) and making statistics on a total amount of destination nodes in the node (cluster_n_feature$_{amount}$), wherein n represents the amount of connected destination nodes in the node;
  making statistics on an amount of the same destination nodes (feature$_{total}$) in the nodes; and
  calculating the associated weight $$\left(\frac{feature_{total}}{cluster\_n\_feature_{amount}}\right),$$

wherein the amount of the destination nodes (feature$_{total}$) in the node (cluster_n) is divided by the total amount of destination nodes in the node (cluster_n_feature$_{amount}$).

6. The method for merging document clusters according to claim 1, wherein the step of determining whether the associated weights of the destination nodes having the same descriptor exceeds the second threshold value or not further comprises:
  setting the second threshold value; and
  selecting document clusters of the destination nodes with the associated weights $$\left(\frac{feature_{total}}{cluster\_n\_feature_{amount}}\right)$$

greater than the second threshold value, wherein the amount of the destination nodes (feature$_{total}$) in the node (cluster_n) is divided by the total amount of destination nodes in the node (cluster_n_feature$_{amount}$).

7. The method for merging document clusters according to claim 6, wherein after the step of determining whether the associated weights of the destination nodes having the same descriptor exceeds the second threshold value or not, the method further comprises:
  determining whether the associated weights of the destination nodes having the same descriptor exceed the second threshold value or not repetitively, till all the destination nodes are traversed.

* * * * *